(12) United States Patent
Cho et al.

(10) Patent No.: US 6,769,274 B2
(45) Date of Patent: Aug. 3, 2004

(54) METHOD OF MANUFACTURING A PLANAR WAVEGUIDE USING ION EXCHANGE METHOD

(75) Inventors: Doo Hee Cho, Daejon-Shi (KR); Joon Tae Ahn, Daejon-Shi (KR); Min Yong Jeon, Daejon-Shi (KR); Kyong Hon Kim, Daejon-Shi (KR)

(73) Assignee: Electronics and Telecommunications Research Institute, Daejon (KR)

( * ) Notice: Subject to any disclaimer, the term of this patent is extended or adjusted under 35 U.S.C. 154(b) by 390 days.

(21) Appl. No.: 10/033,126

(22) Filed: Dec. 26, 2001

(65) Prior Publication Data

US 2003/0024274 A1 Feb. 6, 2003

(30) Foreign Application Priority Data

Aug. 6, 2001 (KR) ........................................ 2001-47186

(51) Int. Cl.$^7$ ............................................... C03B 27/03
(52) U.S. Cl. ........................................... 65/386; 65/400
(58) Field of Search ........................ 65/385, 400, 394; 385/129

(56) References Cited

U.S. PATENT DOCUMENTS

| | | | | |
|---|---|---|---|---|
| 3,880,630 A | * | 4/1975 | Izawa ........................ | 65/30.14 |
| 4,375,312 A | * | 3/1983 | Tangonan .................... | 385/132 |
| 4,913,717 A | * | 4/1990 | Cooper ....................... | 65/30.13 |
| 4,963,177 A | * | 10/1990 | Najafi et al. .................. | 65/400 |
| 5,035,734 A | | 7/1991 | Honkanen et al. | |
| 5,160,360 A | | 11/1992 | Seki et al. | |
| 5,160,523 A | * | 11/1992 | Honkanen et al. ............ | 65/400 |
| 6,470,712 B2 | * | 10/2002 | Koyama et al. .............. | 65/392 |

FOREIGN PATENT DOCUMENTS

| | | |
|---|---|---|
| JP | 05-066435 | 9/1991 |
| JP | 1996-0008362 | 3/1996 |

OTHER PUBLICATIONS

"Polarization Insensitive Ion–Exchanged Arrayed-Waveguide Grating Multiplexers in Glass", B. Buchyold, et al, Fiber and Integrated Optics, 17:279–298, 1998, copyright Taylor & Francis.

"Field–assisted ion exchange in glass: The effect of masking films", B. Pantchev, et al., Appl. Phys. Lett 62, Mar. 15, 1993, American Institute of Physics, pp. 1212–1213.

"Stripe waveguides with matched regractive index profiles fabricated by ion exchange in glass", T. Poszner, et al., J. Appl. Phys., Aug. 15, 1991, 1991 American Institute of Physics, pps. 1966–1974.

* cited by examiner

*Primary Examiner*—John Hoffmann
(74) *Attorney, Agent, or Firm*—Blakely Sokoloff Taylor & Zafman LLP

(57) ABSTRACT

The present invention relates to a method of manufacturing a waveguide using an ion exchange process. The present invention controls the refractive index and the thickness of a surface layer on a glass substrate using an ion exchange process, forms the waveguide pattern on the surface layer by means of photolithography and etching process and coats with materials having the refractive index same to or lower than that of the glass substrate to form a cladding layer. Accordingly, the present invention can manufacture a planar waveguide, which is excellent in dimension control and reproducibility and has a sharp step wall.

10 Claims, 1 Drawing Sheet

METHOD OF MANUFACTURING A PLANAR WAVEGUIDE USING ION EXCHANGE METHOD

BACKGROUND OF THE INVENTION

1. Field of the Invention

The invention relates to a method of manufacturing a planar waveguide using an ion exchange method, and more particularly to a method of manufacturing a planar waveguide formed in a glass substrate having a step wall. The method of this invention can precisely control the dimension of waveguide and has an outstanding reproducibility.

2. Description of the Prior Art

Recently, as wavelength division multiplexing (WDM) optical communication systems are employed, demand for optical devices used in the WDM optical communication systems has been significantly increased.

Optical fiber is usually used as a transfer path of optical signals on optical communications. However, there is a technical limit in manufacturing the fiber device having multi-channel such as a multi-channel optical coupler and WDM device. Therefore, a planar light waveguide circuit (PLC) where optical waveguides and many unit optical devices are integrated is used in WDM devices. The planar type optical devices can be made of various materials such as glass, semiconductors, amorphous silica and polymer. Amorphous silica is similar to material for the optical fiber and has low transmission loss and low coupling loss with the optical fiber. The PLC made by amorphous silica can be manufactured with a similar process to the semiconductor integrated circuit manufacturing process, therefore, it has been widely used as materials for the planar optical waveguides. A method of manufacturing the planar waveguides using amorphous silica includes a flame hydrolysis deposition (FHD) and a reactive ion etching (RIE) method. The silica planar waveguide produced by the FHD and RIE method has a relatively high accuracy of waveguide dimensions and has a sharp step wall of waveguide. However, the FHD process requires a high temperature, and it is very difficult to control the processing factors. In addition, the core portion of the waveguide may be changed by high temperature process when the surface cladding layer is stacked, which makes the quality control difficult and results in an increase of the manufacturing cost.

Due to these problems, a method of manufacturing the planar waveguides by means of an ion exchange method using special silicate glass, which is simple in the manufacturing process, has recently been developed.

An example for the method of manufacturing the planar waveguide using the ion exchange method includes U.S. Pat. No. 4,913,717 (Apr. 3, 1990) entitled "Method for Fabricating Buried Waveguides, U.S. Pat. No. 5,035,734 (Jul. 31, 1991) entitled "Method of Producing Optical Waveguides", U.S. Pat. No. 5,160,360 (Nov. 3, 1992) entitled "Process for Producing Low-loss Embedded Waveguide", Strip Waveguides with Matched Refractive Index Profiles Fabricated by Ion Exchange in Glass (pp.1966~1974 of 'J. Appl. Phys', 1991 by T. Poszner, G. Schreiter, R. Muller), Field-Assisted Ion Exchange in Glass: the Effect of Masking Film (pp.1212~1214 of 'Appl. Phys. Lett', 1993 by B. Pantchev, P. Danesh, Z. Nikolov), and Polarization Insensitive Ion-Exchanged Arrayed-Waveguide Grating Multiplexers in Glass (pp. 279~298 of 'Fiber and integrated opitics', 1998 by B. Buchold, C. Glingener, D. Culemann, E. Voges).

The method of manufacturing the planar waveguide using the ion exchange method, which was proposed by the patents and papers, can be summarized as follows.

The ion exchange is occurred between a specific ion within the substrate glass (dominantly $Na^+$) and that within a salt solution containing specific ions (such as $K^+$, $Ag^+$, $Cs^+$, $Li^+$, $Rb^+$, and $Tl^+$) when the glass surface between metal thin films called as a mask contacts with the salt solution. Based on this principle, a waveguide having high refractive indices is formed at predetermined portion of the substrate glass.

However, this ion exchange method has disadvantages that it can not exactly control the dimension of the waveguide and does not form the exact difference of refractive index between core and cladding since it basically uses diffusion of specific ions such as $Na^+$, $K^+$, $Ag^+$. In case of silicate glass, a network structure of $Si^{4+}$ ion and oxygen ion has a strong covalent bond, but alkali ions have relatively a week bonding with oxygen ions and exist at the vacant places between oxygen ions. Therefore, when the glass surface is contacted with molten salt at high temperature, a part of $Na^+$ ion having a small ionic radius in the glass is diffused out of the glass and $K^+$ or $Ag^+$ ions within the molten salt are diffused into the glass, thus the ions are exchanged. Because a thermal diffusion that governs the ion exchange has no directional characteristics and the driving force of it is determined by the concentration gradient, the concentration profile of exchanged ions in the glass has a gradient distribution from the exchange center. Due to this, the ion exchange method by thermal process is very difficult to form a waveguide having a definite step in the refractive index between core and cladding, a sharp wall, and a precise dimension.

When an electric field assisted ion exchange method is used, exchanged ions are dominantly moved toward a direction to which an electric field is applied, that is, to the cathode. Thus, the electric field assisted ion exchange method can easily control the dimension of the waveguide and can pull down the half circle shaped ion exchange layer on the surface into the glass. However the mobility of network modifier ions in glass is too low at room temperature, it must be heated up to high temperature of 300~400° C. in order to form a desired waveguide. Thus, the electric field assisted ion exchange method is difficult to exactly control the waveguide width and shape and can not avoid a distribution of the refractive index since the diffusion toward a direction vertical to the electric field is not absolutely precluded. In addition, the diffusion distance and the concentration gradient are changed depending on the width of mask aperture and initial ion concentration of the ion exchanged layer even if the ion exchange is performed at same temperature and electric field. Therefore, the conventional electric field assisted ion exchange method is also difficult to manufacture an optical waveguide having a complicate shape such as AWG (arrayed waveguide grating).

The manufacturing process of waveguides using the conventional ion exchange method is performed at a relatively low temperature compared to the FHD-RIE method and employs silicate glass as a substrate, thus the manufacturing cost and time can be reduced. The conventional manufacturing process of waveguides using the ion exchange method has an advantage for mass-production of waveguides, that is, stable, inexpensive and highly durable planar waveguides can be produced. But the conventional ion exchange method has some problems. The metal thin film used as mask is eroded by the reaction between the metal thin film and the molten salt. Also, the dimension or the shape of the waveguide pattern may be changed when the mask of the metal thin film is partially taken off in the process. Further, it takes a lot of time to form the waveguide having a sufficient depth from the surface. It is difficult to form the waveguide wall having a step shape with a sharp step of the refractive index. The waveguide having a complicate shape is difficult to be manufactured because the ion concentration and the penetration depth depend on the waveguide pattern width. There has been an effort to control the amount and depth of ion exchanged by using a mesh-type mask. However, this method is also difficult to precisely control the dimension of waveguides to the accuracy that is required in an optical waveguide.

SUMMARY OF THE INVENTION

The object of the present invention is to provide a method that solves the problem of conventional ion exchange method for planar waveguides and produces the ion exchange planar waveguide, which is stable, low cost and has a precisely controlled dimension, good reproducibility and a sharp step wall. In order to accomplish this object, the method of manufacturing the planar waveguide according to the present invention comprises three steps. The firs step is making a surface layer having a higher refractive index than that of glass substrate and a given thickness on a glass substrate by an ion exchange process; the second step is forming the pattern of the waveguide within the surface layer on the glass substrate; and the third step is coating a cladding layer on the entire surface including the waveguide. An ion exchange process can increase the refractive index of the surface layer on the glass substrate. The ion exchange process comprises the steps of dipping the glass substrate into a molten salt for the determined time so that the refractive index of the surface layer of the glass substrate is raised by the ion exchange, and taking out the glass substrate from the molten salt and cleaning the glass substrate.

BRIEF DESCRIPTION OF THE DRAWINGS

The aforementioned aspects and other features of the invention will be explained in the following description, taken in conjunction with the accompanying drawings, wherein.

DETAILED DESCRIPTION OF PREFERRED EMBODIMENTS

Figure 1A:
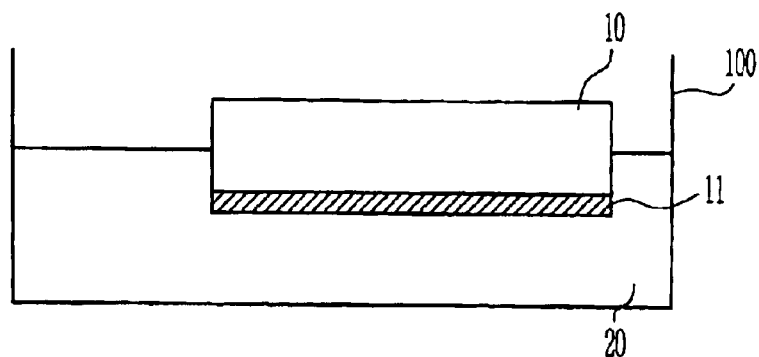
FIGS. 1a to 1e are cross-sectional views for explaining a manufacturing method of a waveguide according to an embodiment of the present invention.

The present invention will be described in detail by way of a preferred embodiment with reference to accompanying drawings, in which like reference numerals are used to identify the same or similar parts.

Referring to FIGS. 1a to 1e, where cross-sectional views are shown for explaining a method of manufacturing a waveguide according to the embodiment of the present invention.

It can be seen from FIG. 1a that a surface layer 11 is formed on the surface of a glass substrate 10 wherein the refractive index of the surface layer 11 is higher than that of the glass substrate 10. The refractive index of the substrate glass is between 1.45 and 1.60. The glass substrate 10 is dipped into a molten salt 20 that is in a container 100 at a given temperature for a given time to allow an ion exchange of a given depth, thus forming the surface layer 11.

The glass substrate 10 may include soda-lime silicate glass, aluminosilicate glass or borosilicate glass, which have a good ion exchange characteristic. The molten salt 20 may include either a nitrate, a sulfate or a chlorate in which they contain $K^+$, $Ag^+$, $Cs^+$, $Li^+$, $Rb^+$ or $Tl^+$ ions. A mixture which consists of a nitrate, a sulfate or a chlorate salt of these ions and a nitrate, a sulfate or a chlorate salt of $Na^+$ ion can also be used as a raw material of molten salt. Both thermal ion exchange method and an electric field assisted ion exchange method can be used as an ion exchange process.

A manufacturing process of thin film of the surface layer on the glass substrate 11 by using the thermal ion exchange method is described as following. The glass substrate 10 is dipped into molten salt (i.e., a nitrate, a sulfate or a chlorate) having the melting point lower than 500° C. where $K^+$, $Ag^+$, $Cs^+$, $Li^+$, $Rb^+$ or $Tl^+$ is contained, and is then heated at the temperature of 200~500° C. for 10~120 minutes. At this time, the molten salt comprises a salt of $Na^+$ ion and a salt containing ions to be exchanged with an adequate ratio. Alkali ions in the glass substrate 10 are exchanged with the exchanging ions by the thermal diffusion, so that the refractive index of the surface layer 11 is increased. In order to control the depth and the refractive index of the surface layer on the glass substrate 11, the kind of the salt to be used as the molten salt, the concentration of the exchanging ions, and the temperature and time of heating process must be precisely controlled.

Also, the electric field assisted ion exchange method will be described below. A cathode is deposited on the rear surface of the glass substrate 10. Then, a molten salt contacts the front surface where the surface layer 11 of the glass substrate 11 will be formed. Then, an anode is inserted into the molten salt and is then heated with applying an electric field for ion exchange. At this time, the process factor such as the kind of molten salt, the temperature and time of the heating process is similar to the thermal ion exchange method, and an electric field of 10~200 V/mm is applied. In the electric field assisted ion exchange method exchanging ions can be diffused by the thermal diffusion and electric field, thus the annealing temperature and time can be reduced and refractive index profile will be steep.

Figure 1B:
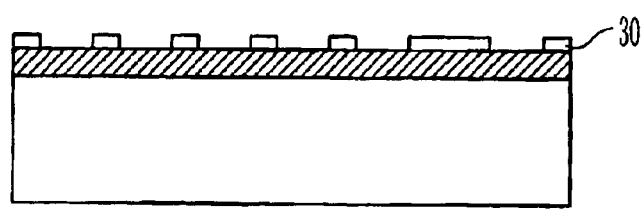

Referring now to FIG. 1b, the glass substrate 10 is taken out from the molten salt. A common cleaning process is performed to clean the surface layer 11. Then, a waveguide pattern with photo resists film or metal film is formed on the ion exchanged surface layer 11 by photolithography method employing a photo mask or electron beam lithography method. At this time, a photo resist or metal film pattern 30 remains at a portion wherein the waveguide will be formed.

Figure 1C:
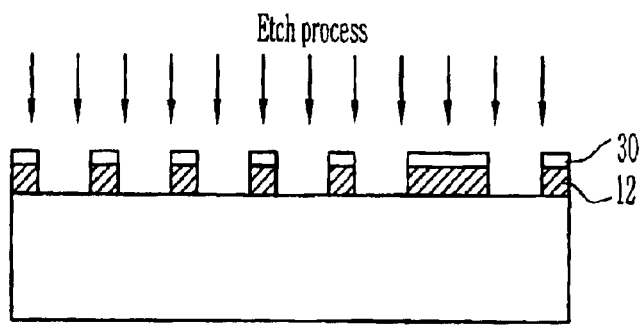

Referring to FIG. 1c, the ion exchanged surface layer 11 is etched by a dry etching method such as reactive ion etching (RIE) or a wet etching method using diluted fluoric acid using the photo resist or metal film pattern 30 as a mask. Then the waveguide is on the glass substrate 10 at a portion where the photo resist or metal film pattern 30 remains. At this time, in order to make the wall of the waveguide 12 sharp, it is preferred that a dry etch is used.

Figure 1D:
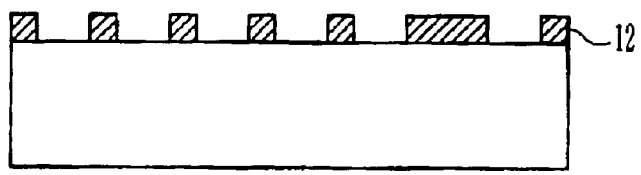

Referring to FIG. 1d, a common strip process is performed to remove the mask pattern 30. Then, a cleaning process is performed to clean the entire top structure including the waveguide 12.

Figure 1E:
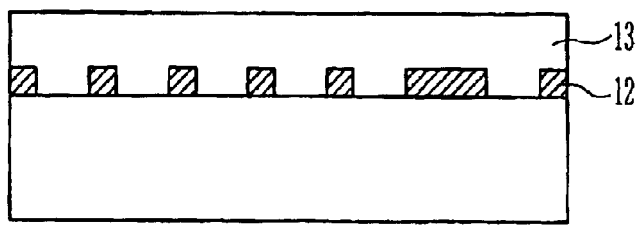

By reference to FIG. 1e, a material having a refractive index same to or lower than that of the glass substrate 10 is coated on the entire surface to form a cladding layer 13. The cladding layer 13 is formed by coating polymer resin, low-melting glass or crystalline oxide on the entire top surface including the waveguide 12.

The polymer materials may include poly siloxane series, poly acrylate series, poly ether series, poly ester series and poly imide series, and their refractive index can be controlled in the range of 1.45~1.60 depending on the composition. The polymer materials are suitable for a cladding material since they are chemically and mechanically stable and their refractive index can be easily controlled between 1.45 and 1.60.

A polymer material can be coated on the glass waveguide surface by a spin coating method. In order to improve the adhesion characteristics with the glass substrate 10, a primer is coated on the entire surface before the cladding layer 13 is coated, and a protection layer may be coated on the cladding layer to protect the cladding layer 13. Either thermally curable resin or UV curable resin can be used as the cladding material. After the spin coating, the former polymer is heated to be cured at a given temperature and the latter polymer is exposed by UV rays.

When the polymer material is used as the cladding material 13, the waveguide can be buried at near room temperature. Therefore, the shape and the dimension of the waveguide 12 will be hardly changed and the internal stress due to the difference in a thermal expansion between the glass substrate and the cladding material is significantly reduced. Thus, the waveguide having a good optical characteristic can be finally formed.

As mentioned above, a method of manufacturing a glass planar waveguide according to the present invention minimizes the disadvantage in the conventional ion exchange method while maintaining the advantage in it.

By explaining it in detail, first, the present invention can allow mass-production like the method of manufacturing the planar waveguide by the conventional ion exchange method. The present invention employs an inexpensive silicate glass having a refractive index that is easily changed depending on the composition.

Second, in the present invention, soda-lime silicate glass, borosilicate glass and aluminosilicate glass are used as the substrate, which have a good ion exchange property and the refractive index of 1.45~1.60. The ions such as $K^+$, $Ag^+$, $Cs^+$, $Li^+$, $Rb^+$, $Tl^+$ contained in the molten salt can be sufficiently exchanged with $Na^+$ ions within a glass substrate.

Third, the present invention uses the glass substrate having a refractive index of 1.45~1.60, so that a desired refractive index can be selected. Therefore, a polymer material that is used in a common passive waveguide having the same range of the refractive index can be used as a cladding layer. The present invention can reduce the manufacturing cost and can form the precisely defined surface cladding layer with simplicity by means of already-developed spin coating method.

Fourth, a manufacturing method of a waveguide using a conventional ion exchange method uses a mask of a metal thin film on the surface of the glass substrate before an ion exchange process. On the contrary, the present invention performs the ion exchange process without the mask of the metal thin film, thus forming an ion-exchanged surface layer having a uniform thickness on the glass substrate. Therefore, the present invention can omit a process of removing and cleaning the deposited metal thin films and can prevent a problem that the metal thin films are eroded by molten salt.

Fifth, a manufacturing method of a waveguide using a conventional ion exchange method is difficult to control precisely the dimension of the waveguide and to form a sharp waveguide wall. In the present invention, the width of the waveguide is controlled by a photolithography and etching method. Therefore, the dimension can be controlled with a high accuracy (below 0.2 μm). Since the waveguide wall can be formed by RIE and the cladding material is coated at low temperature, a vertical wall can be easily kept. And the present invention can make the sharp boundary between the core and the cladding and can reduce optical loss of the waveguide compared to the conventional ion exchange method.

Sixth, the present invention can reduce the manufacturing cost and can easily control the processing factor since it does not perform a high temperature process such as FHD.

According to the process of the present invention, a waveguide that is excellent in dimension control and reproducibility and has a sharp step wall can be produced. When the present invention is applied to passive type optical devices and PLC such as an optical branch, an optical coupler, and an AWG (arrayed waveguide grating), they can represent good optical properties such as the optical loss and the crosstalk and effectiveness for mass-production.

What is claimed is:

1. A method of manufacturing a planar waveguide, comprising the steps of:
   providing a glass substrate;
   forming a surface layer on said glass substrate by means of ion exchange process where the refractive index of said surface layer is higher than that of said glass substrate;
   forming a waveguide pattern on said surface layer of said glass substrate by photolithography and etching; and
   forming a cladding layer on the entire surface including the waveguide pattern.

2. The method of manufacturing a planar waveguide as claimed in claim 1, wherein the refractive index of said glass substrate is 1.45 and about 1.60.

3. The method of manufacturing a planar waveguide as claimed in claim 1, wherein said glass substrate comprises at least one member of the group consisting of soda-lime silicate glass, aluminosilicate glass and borosilicate glass.

4. The method of manufacturing a planar waveguide as claimed in claim 1, wherein said ion exchange process employs either a thermal ion exchange method or an electric field assisted ion exchange method.

5. The method of manufacturing a planar waveguide as claimed in claim 4, wherein a molten salt that is used in the ion exchange processes includes comprises at least one member of the group consisting of a nitrate, a sulfate and a chlorate and wherein said salt comprises at least one member of the group consisting of $K^+$, $Ag^+$, $Cs^+$, $Li^+$, $Rb^+$ and $Tl^+$ ions.

6. The method of manufacturing a planar waveguide as claimed in claim 5, wherein said molten salt further comprises $Na^+$ ions.

7. The method of manufacturing a planar waveguide as claimed in claim 1, wherein said etching is process for forming the waveguide pattern is implemented by means of either a dry etch using reactive ion etching method or a wet etch using diluted fluoric acid.

8. The method of manufacturing a planar waveguide as claimed in claim 1, wherein said cladding layer comprises at least one member of the group consisting of polymer, glass and crystalline oxide which have a refractive index same as or lower than that of said glass substrate.

9. The method of manufacturing a planar waveguide as claimed in claim 8, wherein said polymer is a resin which comprises at least one member of the group consisting of poly siloxane series, poly acrylate series, poly ether series, poly ester series and poly imide series having a refractive index between about 1.45 and about 1.60.

10. The method of manufacturing a planar waveguide as claimed in claim 8, wherein said polymer is a thermally curable resin or an UV curable resin.

* * * * *

UNITED STATES PATENT AND TRADEMARK OFFICE
CERTIFICATE OF CORRECTION

PATENT NO. : 6,769,274 B2  Page 1 of 1
DATED : August 3, 2004
INVENTOR(S) : Cho et al.

It is certified that error appears in the above-identified patent and that said Letters Patent is hereby corrected as shown below:

<u>Column 6,</u>
Line 37, please delete "processes" and insert -- process --.
Line 48, please delete "method".

Signed and Sealed this

Twenty-eighth Day of June, 2005

JON W. DUDAS
*Director of the United States Patent and Trademark Office*